US009553357B2

(12) United States Patent
Taeger

(10) Patent No.: US 9,553,357 B2
(45) Date of Patent: Jan. 24, 2017

(54) ANTENNA MOUNTING SYSTEM

(75) Inventor: Marty R. Taeger, Burlington, IA (US)

(73) Assignee: Winegard Company, Burlington, IA (US)

( * ) Notice: Subject to any disclaimer, the term of this patent is extended or adjusted under 35 U.S.C. 154(b) by 1056 days.

(21) Appl. No.: 13/613,362

(22) Filed: Sep. 13, 2012

(65) Prior Publication Data

US 2014/0070069 A1 Mar. 13, 2014

(51) Int. Cl.

| | |
|---|---|
| ***H01Q 1/12*** | (2006.01) |
| ***H01Q 1/32*** | (2006.01) |
| ***H01Q 1/28*** | (2006.01) |
| ***H01Q 1/08*** | (2006.01) |
| *B60R 11/00* | (2006.01) |
| *H01Q 1/42* | (2006.01) |

(52) U.S. Cl.

CPC ............ *H01Q 1/3275* (2013.01); *H01Q 1/088* (2013.01); *H01Q 1/1207* (2013.01); *H01Q 1/1214* (2013.01); *H01Q 1/288* (2013.01); *H01Q 1/3283* (2013.01); *H01Q 1/3291* (2013.01); *B60R 2011/004* (2013.01); *B60R 2011/0061* (2013.01); *H01Q 1/12* (2013.01); *H01Q 1/42* (2013.01)

(58) Field of Classification Search

CPC .............................. H01Q 1/088; H01Q 1/3275

See application file for complete search history.

(56) References Cited

U.S. PATENT DOCUMENTS

| | | | | | |
|---|---|---|---|---|---|
| 1,116,387 | A * | 11/1914 | Coda | F02M 21/04 | 285/276 |
| 1,354,710 | A * | 10/1920 | Wise | A47L 9/242 | 285/276 |
| D132,380 | S * | 5/1942 | Page | 343/872 | |
| 2,834,961 | A * | 5/1958 | Lear, Sr. | H01Q 1/283 | 343/705 |
| 3,871,691 | A * | 3/1975 | Takagi | F16L 21/08 | 285/321 |
| D245,778 | S * | 9/1977 | Langner | D14/230 | |

(Continued)

FOREIGN PATENT DOCUMENTS

| | | | | |
|---|---|---|---|---|
| DE | 4230518 | A1 * | 3/1994 | H01Q 1/088 |
| DE | EP 0586896 | A1 * | 3/1994 | H01Q 1/088 |

(Continued)

*Primary Examiner* — Joshua J Michener
*Assistant Examiner* — Chiedu Chibogu
(74) *Attorney, Agent, or Firm* — W. Scott Carson

(57) ABSTRACT

An antenna mounting system for use with recreational vehicles and boats as well as stationary objects. The system includes a pedestal securable to the recreational vehicle and an antenna head containing an antenna element and securable to the pedestal. The pedestal has an upstanding male portion slidably receivable in a mating, female portion of the antenna head. In assembling the system, the male and female portions are first axially aligned and then moved axially toward each other to a predetermined, operating position where they are snapped together in a locking engagement. Anti-rotation structure including one or more pairs of mating, channels and protuberance is also provided to prevent the pedestal and antenna head from being rotated relative to each other about their aligned axes (and the coaxial cable running through them from being twisted) as they are moved together to the predetermined and locked, operating position.

21 Claims, 13 Drawing Sheets

(56) References Cited

U.S. PATENT DOCUMENTS

| | | | | | |
|---|---|---|---|---|---|
| 4,431,218 | A * | 2/1984 | Paul, Jr. | F16L 37/144 | 285/305 |
| D275,673 | S * | 9/1984 | Iino | D14/230 | |
| 4,868,577 | A * | 9/1989 | Wingard | H01Q 1/3275 | 343/713 |
| 5,163,712 | A * | 11/1992 | Sabo | F16L 23/0286 | 285/24 |
| 5,593,187 | A * | 1/1997 | Okuda | F16L 37/088 | 285/305 |
| 5,676,174 | A * | 10/1997 | Berneski, Jr. | F16L 55/1152 | 138/89 |
| 5,964,483 | A * | 10/1999 | Long | F16L 37/144 | 285/305 |
| 6,100,852 | A * | 8/2000 | Calearo | H01Q 1/088 | 343/702 |
| D442,168 | S * | 5/2001 | Warner | D14/231 | |
| 6,331,838 | B1 * | 12/2001 | Scott | H01Q 1/085 | 343/715 |
| 6,747,603 | B1 * | 6/2004 | Tornatta, Jr. | H01Q 1/1214 | 343/715 |
| 6,864,846 | B2 * | 3/2005 | King | H01Q 1/125 | 343/713 |
| 7,358,909 | B2 * | 4/2008 | Sherwood | H01Q 1/084 | 343/713 |
| D592,037 | S * | 5/2009 | Mattson | D8/310 | |
| 2011/0221654 | A1 * | 9/2011 | Hsu | H01Q 1/088 | 343/906 |
| 2011/0291913 | A1 * | 12/2011 | Lai | H01Q 1/3275 | 343/878 |

FOREIGN PATENT DOCUMENTS

| | | | | |
|---|---|---|---|---|
| DE | EP 1638162 | A1 * | 3/2006 | H01Q 1/084 |
| FR | 2678689 | A1 * | 1/1993 | F16B 39/28 |
| FR | EP 0521746 | A1 * | 1/1993 | F16B 39/28 |
| JP | EP 1182726 | A2 * | 2/2002 | H01Q 1/084 |

* cited by examiner

ANTENNA MOUNTING SYSTEM

BACKGROUND OF THE INVENTION

1. Field of the Invention

This invention relates to the field of antenna mountings and more particularly to the field of antenna mountings for attachment to recreational vehicles and boats as well as stationary objects.

2. Discussion of the Background

Antenna mounting systems for objects such as recreational vehicles and boats present many design challenges. In particular, such systems are normally attached to the exterior of the vehicle, boat, or other supporting object and are exposed to the outside weather conditions and the motion of the vehicle or boat. The system must then not only be securely attached to the supporting object but also must be strong enough to protect the relatively delicate, inner antenna element and electronics connecting the antenna element to the interior of the vehicle or boat and to the televisions or other devices in it.

In a common arrangement, the antenna element is housed in a relatively large antenna head that can be secured to a much smaller pedestal that is attached to the exterior of the vehicle or boat. The pedestal and antenna head typically have mating, threaded portions and the antenna head can then be screwed onto the pedestal. A problem that frequently arises in doing so is that the coaxial cable running from the antenna element downwardly through the antenna head and pedestal is also rotated or twisted during this assembly process. The result particularly with multiple revolutions of the antenna head about the pedestal is that the twisted cable can break or worse, the cable can pull and twist the relatively delicate antenna element and its cable attachments and severely damage the unit. The twisted cable can also undesirably pull and twist the electronic devices and attachments below the pedestal leading to the interior of the recreational vehicle or boat and the televisions or other devices in it.

To avoid such twisting problems, some systems use a clamping arrangement wherein the antenna head is moved vertically or axially downwardly onto the pedestal and then the clamping members manually tightened about the pedestal. Although this can avoid the twisting problem, it presents other problems. In particular, the antenna head housing the antenna element in most such systems extends radially outwardly much farther than the pedestal. Additionally, the height of the pedestal is purposely designed to be as short as possible so the antenna head will be as close as possible to the exterior of the vehicle or boat to minimize the resistance forces from wind and the motion of the vehicle or boat. The result is that there is very little room to reach, see, and tighten the clamping members onto the pedestal. Further, a tool and usually a specialty tool must be provided and used to accomplish the tightening. This can add expense to the overall system in having to make and package the tool and provide instructions for its use. It can also complicate and delay the installation process particularly if the installer does not read the instructions or misplaces or loses the tool.

With these and other problems in mind, the present invention was developed. In it, an antenna mounting system is provided with a snapping attachment between the antenna head and pedestal so no tools and particularly no specially tools are needed. With the snapping attachment, the antenna head can be moved axially downwardly onto the pedestal without any rotating or twisting of the antenna head or connecting cables running through it and the pedestal. Additionally, structure is provided to initially align the antenna head and pedestal with a minimal amount of relative rotation between them and to positively prevent the antenna head from being rotated relative to the pedestal during the final steps of the installation process.

SUMMARY OF THE INVENTION

This invention involves an antenna mounting system primarily intended for use with recreational vehicles and boats as well as stationary objects. The system includes a pedestal securable to the recreational vehicle or other supporting object and an antenna head containing an antenna element and securable to the pedestal. The pedestal has an upstanding male portion that is slidably receivable in a mating, female portion of the antenna head. In assembling the system, the male and female portions of the pedestal and antenna head are first axially aligned and then moved axially toward each other to a predetermined, operating position where they are snapped together in a locking engagement.

The antenna mounting system also includes anti-rotation structure. The structure prevents the pedestal and antenna head from being rotated relative to each other about their aligned axes as they are moved together to the predetermined and locked, operating position. In this manner, the coaxial cable running through them will not be twisted as the mounting system is assembled. The anti-rotation structure includes one or more pairs of mating, channels and protuberances on the pedestal and antenna head.

The channels and protuberances as indicated above prevent relative rotation of the aligned pedestal and antenna head as they are axially moved to the predetermined and locked, operating position. The channels and protuberances are additionally designed so that they will initially engage each other with no more than one revolution of the pedestal and antenna head relative to each other about their aligned axes. That is, the pedestal and antenna head can be initially moved toward each other and then rotated relative to each other no more than one revolution before at least one channel and protuberance will engage each other to prevent any further rotation. Once so engaged, the pedestal and antenna head can thereafter be axially moved to the predetermined, operating position with any rotational movement relative to each other positively prevented by the engaged channel and protuberance. In the preferred embodiments, there are multiple pairs of channels and protuberances that will engage each other in much less than a full revolution of the pedestal and antenna head relative to each other to further limit any potentially damaging twisting of the coaxial cable running through them.

DETAILED DESCRIPTION OF THE INVENTION

Figure 1:
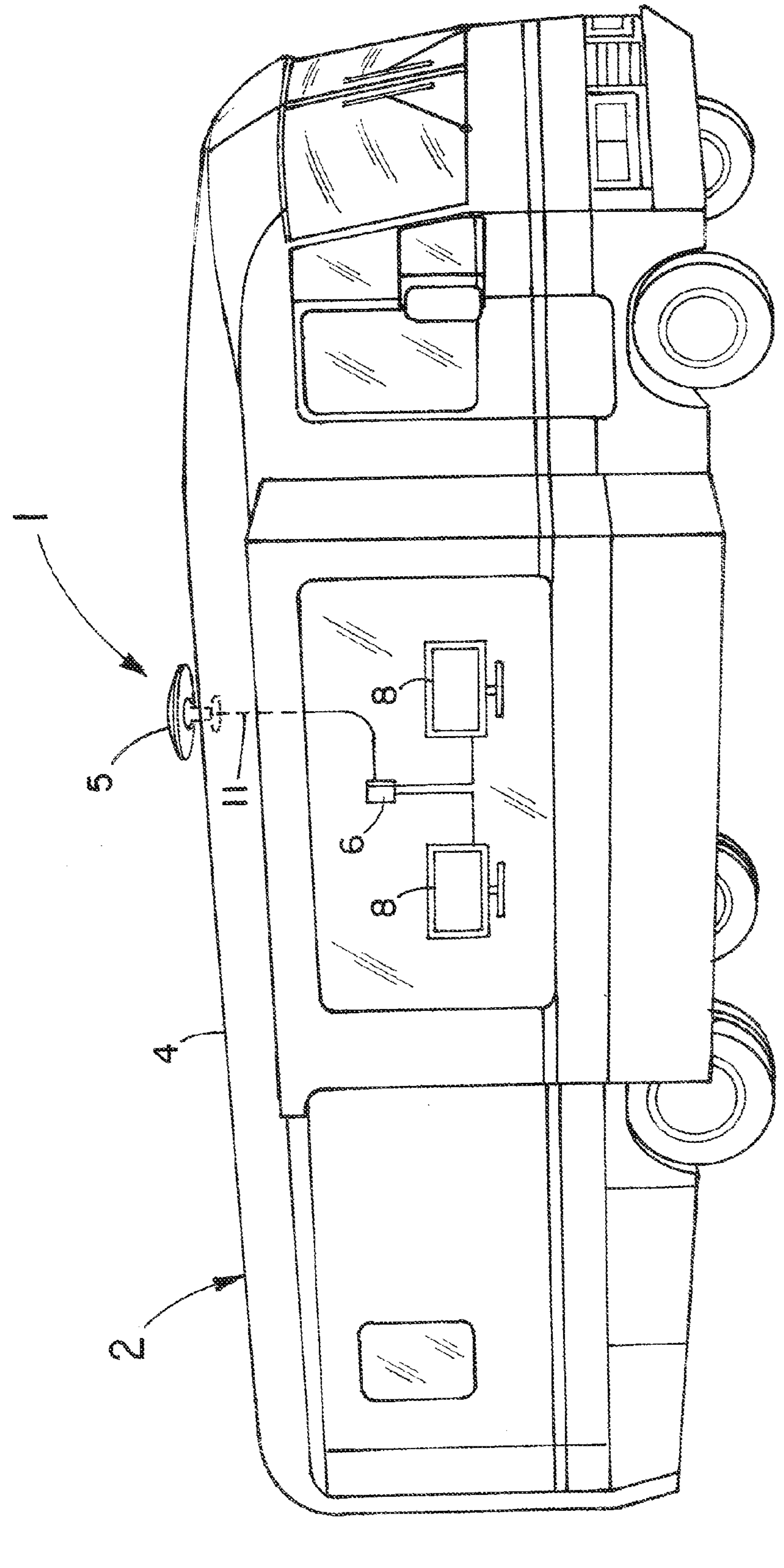
FIG. 1 is a perspective view of the antenna mounting system of the present invention supported on the roof of a recreational vehicle.
Figure 2:
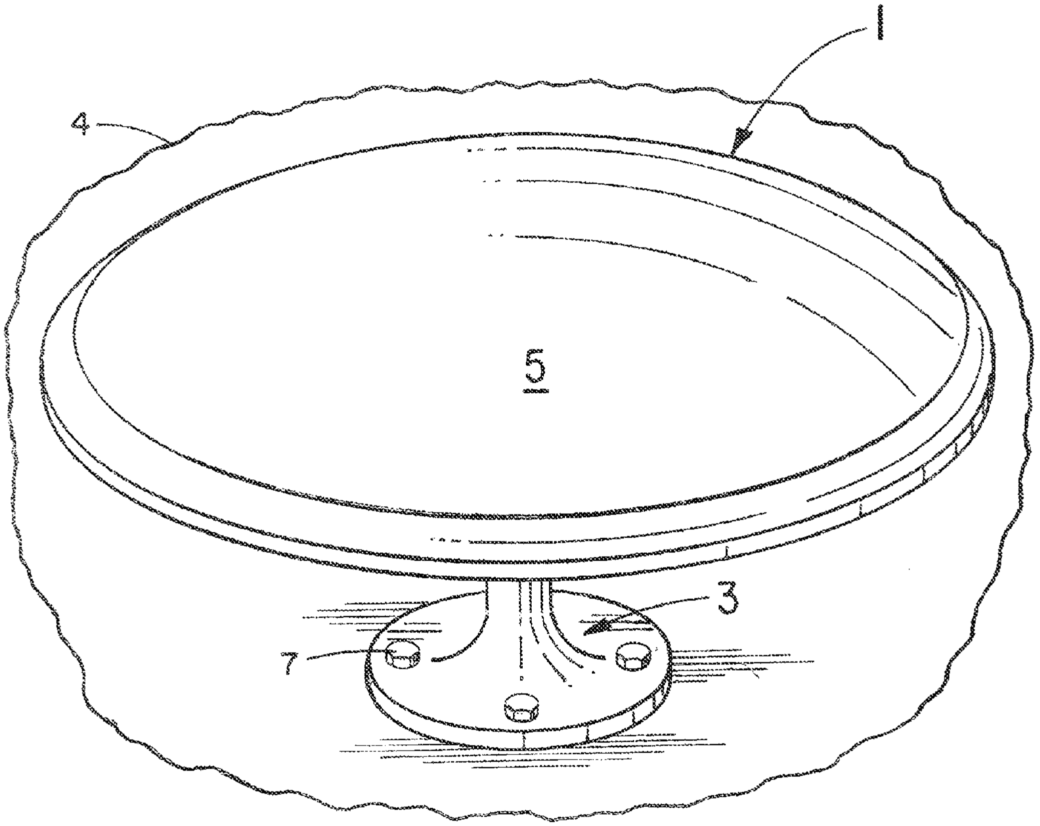
FIG. 2 is an enlarged view of the antenna system mounted on the roof of the recreational vehicle of FIG. 1.
Figure 3:
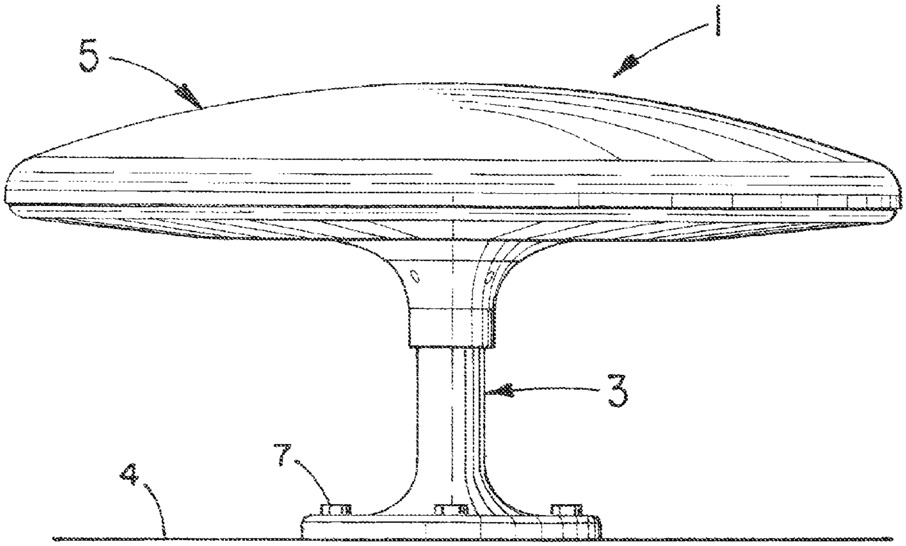
FIG. 3 is a side elevational view of the antenna mounting system of FIG. 2.
Figure 4:
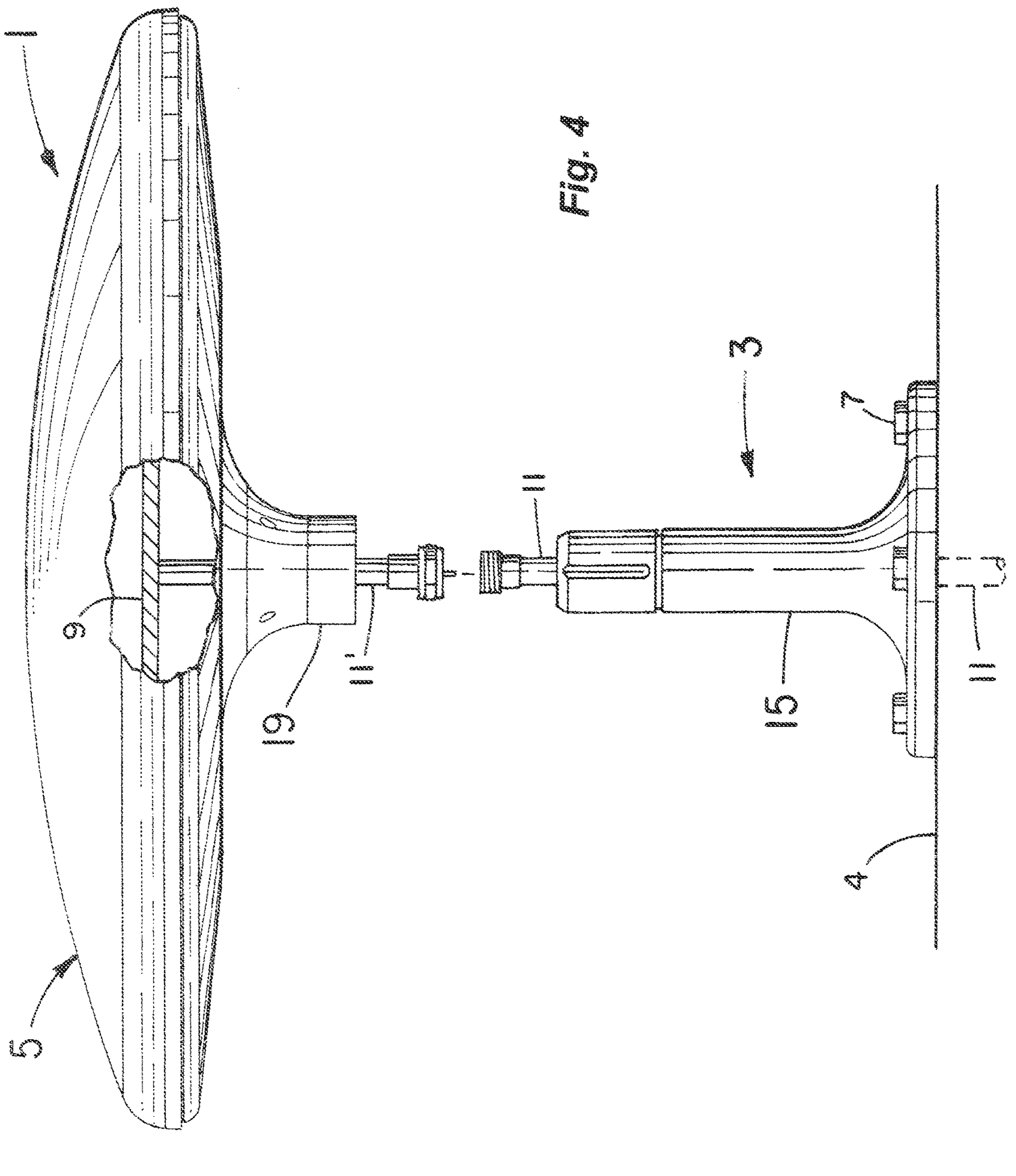
FIG. 4 is a side view of the system showing the coaxial cable running through it.

As seen in FIGS. 1-4, the antenna mounting system 1 of the present invention is primarily intended to be supported on an object such as the recreational vehicle 2 of FIG. 1 on its roof 4 or other part. The antenna mounting system 1 is equally adaptable to being supported on other transport vehicles such as a boat or on a stationary object if desired. The antenna system 1 includes a pedestal 3 (FIGS. 2-4) and an antenna head 5. The pedestal 3 is securable (e.g., by mounting screws 7) to the roof 4 of the recreational vehicle 2 or other object. The antenna head 5 in turn encloses or houses the antenna element 9 (FIG. 4) which is connected by coaxial cables 11,11' to the power supply 6 (e.g., 12 volts) in FIG. 1 of the recreational vehicle 2 and on to the televisions 8 or other receivers or transmitters in the vehicle 2.

Figure 5:
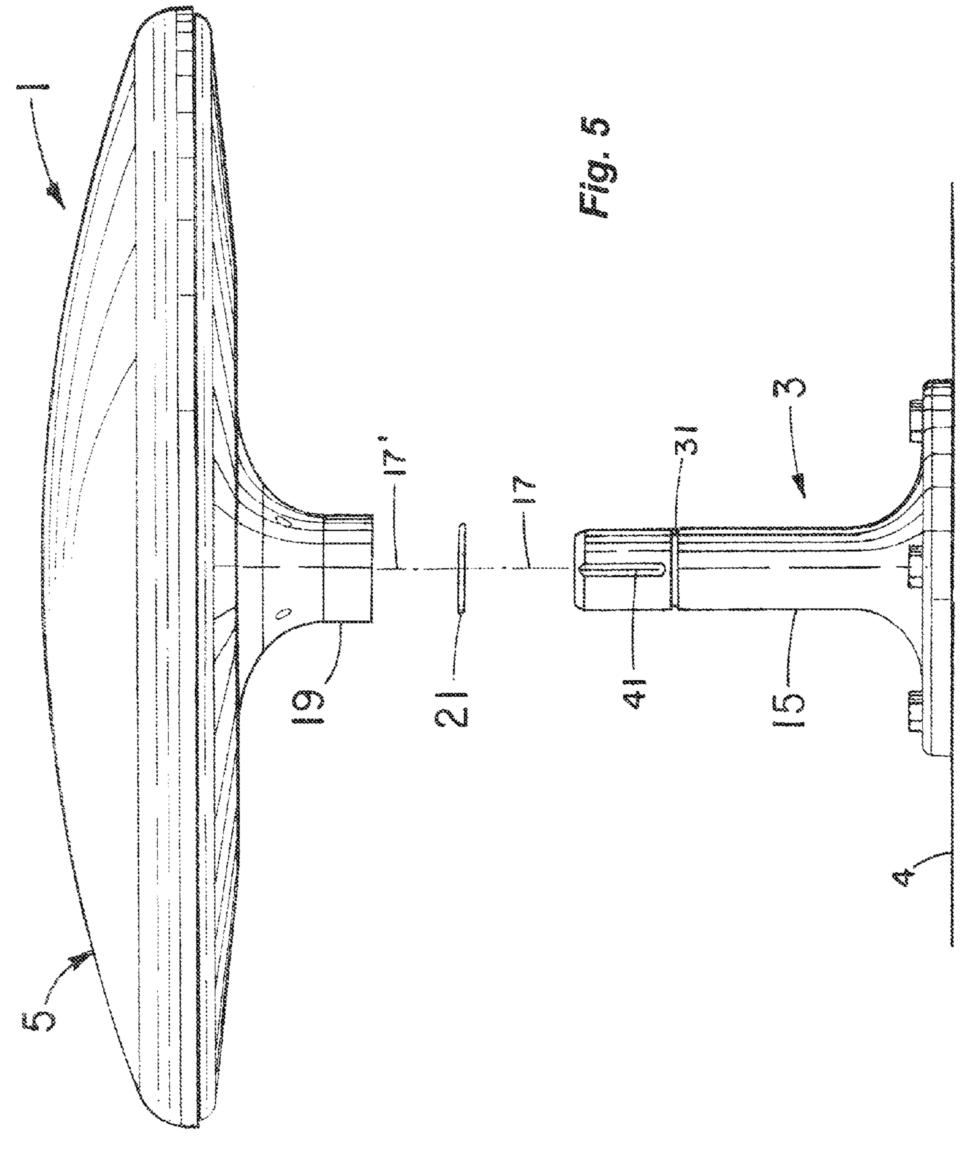
FIG. 5 is a view similar to FIG. 4 showing the pedestal, antenna head, and snap ring of the mounting system of the preferred embodiment. It is noted that the coaxial cable of FIG. 4 is not shown in this and many of the subsequent views for clarity.

The pedestal 3 as illustrated in FIG. 5 has an upstanding, male portion 15 extending along and about the axis 17. The antenna head 5 in turn has a mating, female portion 19 extending along and about the axis 17'. As explained in more detail below, the male portion 15 of the pedestal 3 is slidably receivable in the female portion 19 of the antenna head 5 with the axes 17,17' substantially aligned as in FIG. 5. The male and female portions 15,19 can then be moved axially toward each other and secured in a predetermined, operating position relative to each other by a snapping arrangement. The snapping arrangement as discussed below includes the C-shaped, resilient (e.g., stainless steel) ring 21 of FIGS. 5-7 and cooperating recesses in the pedestal 3 and antenna head 5.

Figure 8:
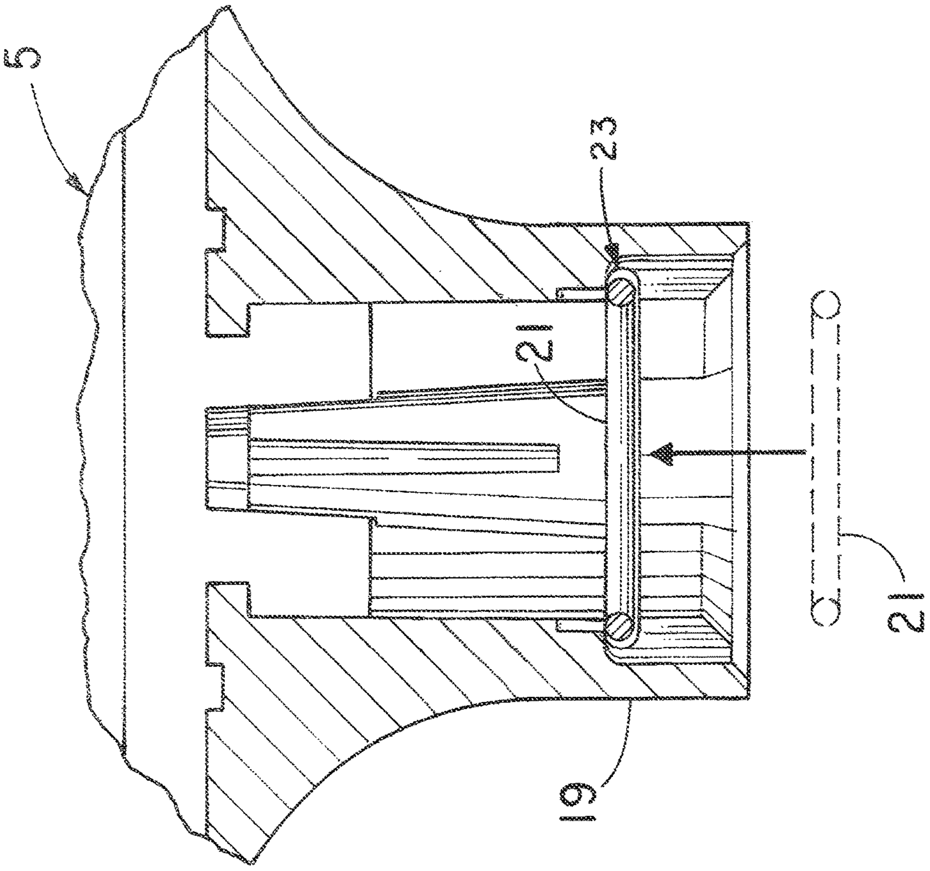
FIG. 8 is a cross sectional view of the antenna head and the snap ring insertable into it.
Figure 6:
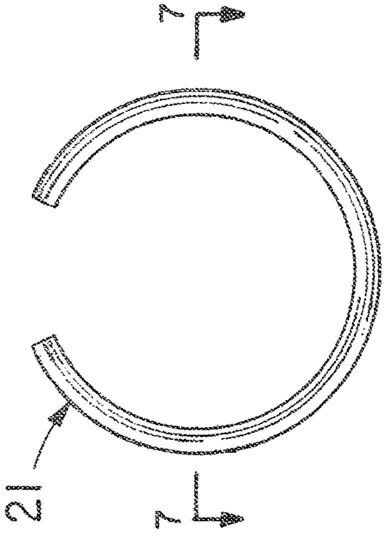
FIG. 6 is a planar view of the snap ring of the preferred embodiment.
Figure 7:
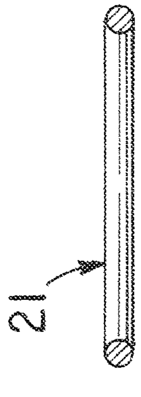
FIG. 7 is a view taken along line 7-7 of the snap ring of FIG. 6.
Figure 9B:
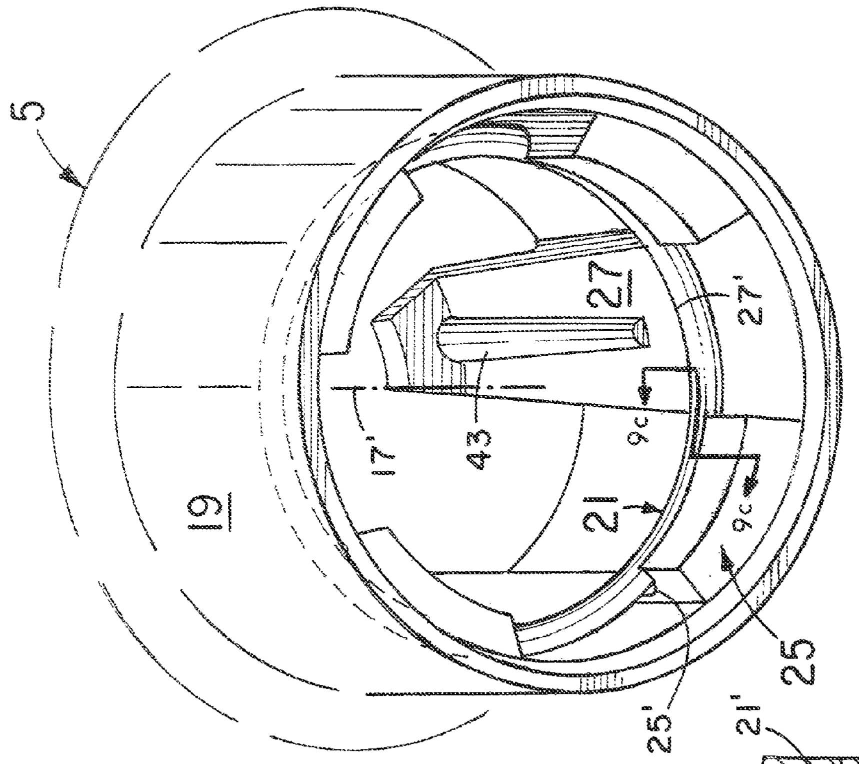
FIGS. 9*a*-9*c* show other views of the antenna head and the snap ring insertable into it.
Figure 9C:
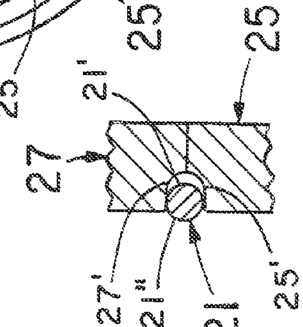
Figure 9A:
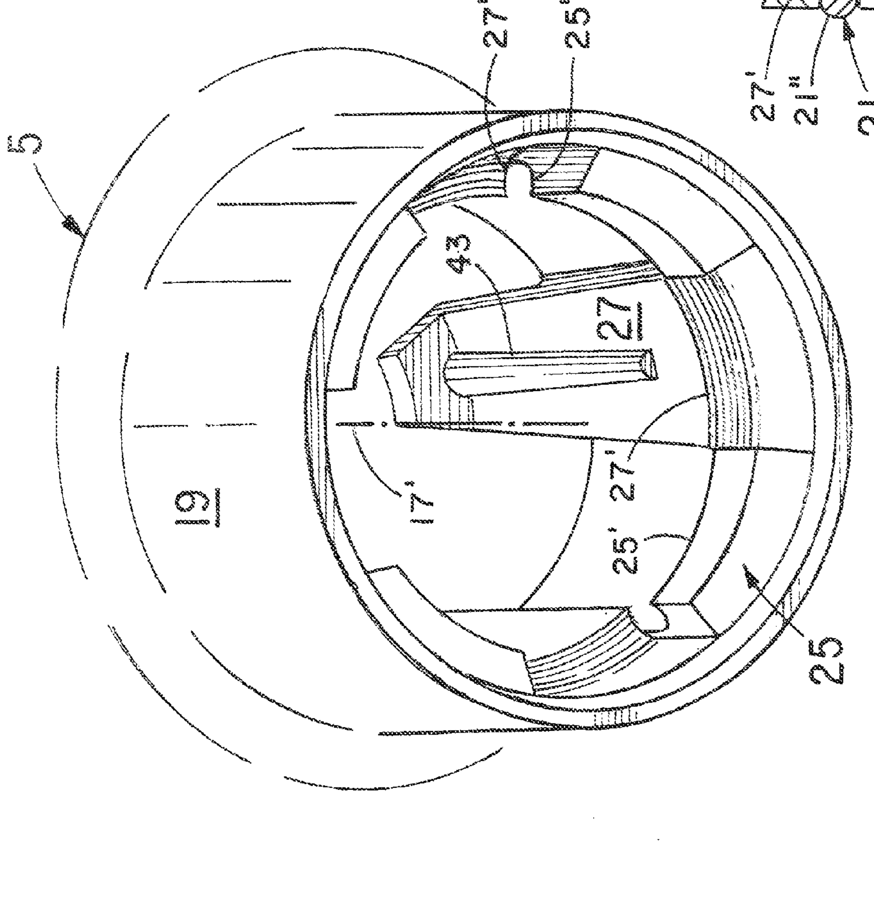

More specifically and in operation, the C-shaped ring 21 of FIGS. 5-7 is first moved upwardly in the orientation of FIGS. 5 and 8 to be positioned and held in a recess arrangement at 23 (FIG. 8) in the female portion 19 of the antenna head 5. The recess arrangement at 23 as perhaps best seen in FIG. 9*a* includes alternating or staggered, retaining members 25,27. Each retaining member 25 in FIG. 9*a* has a substantially upwardly facing lip at 25' and each retaining member 27 has a corresponding downwardly facing lip 27'. In operation and as indicated above, the C-shaped ring 21 is moved upwardly in the orientation of FIG. 8 where it will contact and be compressed or slightly closed as it moves passed the retaining members 25 to be received and retained in the position of FIG. 9*b* by the cooperating lips 25',27'. In this captured position of FIG. 9*b*, the staggered and adjacent, upwardly and downwardly facing lips 25',27' together form a recess about the axis 17' with a substantially C-shaped cross section as illustrated in enlarged FIG. 9*c*. FIG. 9*c* in this regard is taken along line 9*c*-9*c* of FIG. 9*b*. The C-shaped recess of 25',27' as shown in FIGS. 9*b* and 9*c* then retains the outer section 21' of the ring 21 (FIG. 9*c*) leaving the inner section 21" of the ring 21 protruding inwardly toward and substantially perpendicular to the axis 17' of the antenna head 5.

The pedestal 3 as mentioned above and shown in FIG. 10 has a recess 31 extending about the axis 17. The recess 31 preferably has a C-shaped cross section dimensioned to receive the inwardly protruding section 21" of the ring 21 of FIG. 9*c*. That is and in operation, the male and female portions 15,19 of the pedestal 3 and antenna head 5 are moved axially toward each other with the axes 17,17' substantially aligned as in FIGS. 11-14. In doing so, the beveled tip 33 (FIG. 10) of the free standing end section of the male portion 15 of the pedestal 3 contacts the protruding inner section 21" of the ring 21 (FIGS. 11-12) and opens or expands the C-shaped ring 21 (FIG. 12) from a first size to an expanded, second size as it passes. The expanded and tensioned, resilient ring 21 then slides along the outside 35 of the male portion 15 of the pedestal 3 (FIG. 13) until the position of FIG. 14 in which the inner section 21" of the expanded and tensioned, resilient ring 21 snaps into the recess 31 of the male portion 15 of the pedestal 3. In this snapped position of FIG. 14, the male and female portions 15,19 of the pedestal 3 and antenna head 5 are securely maintained in locking engagement in the predetermined position relative to each other of FIG. 14. The C-shaped ring 21 as mentioned above can be made of stainless steel or other resilient material and has an outside diameter (FIGS. 6-7) on the order of one inch with the diameter of its substantially circular cross section (FIG. 7) being on the order of 0.085 inches. The gap between its ends of the C-shape in FIG. 6 is on the order of 0.375 inches with the ring 21 relaxed and the gap is increased on the order of 1/16 inch when the ring 21 is moved to its expanded and tensioned position discussed above.

Figure 14:
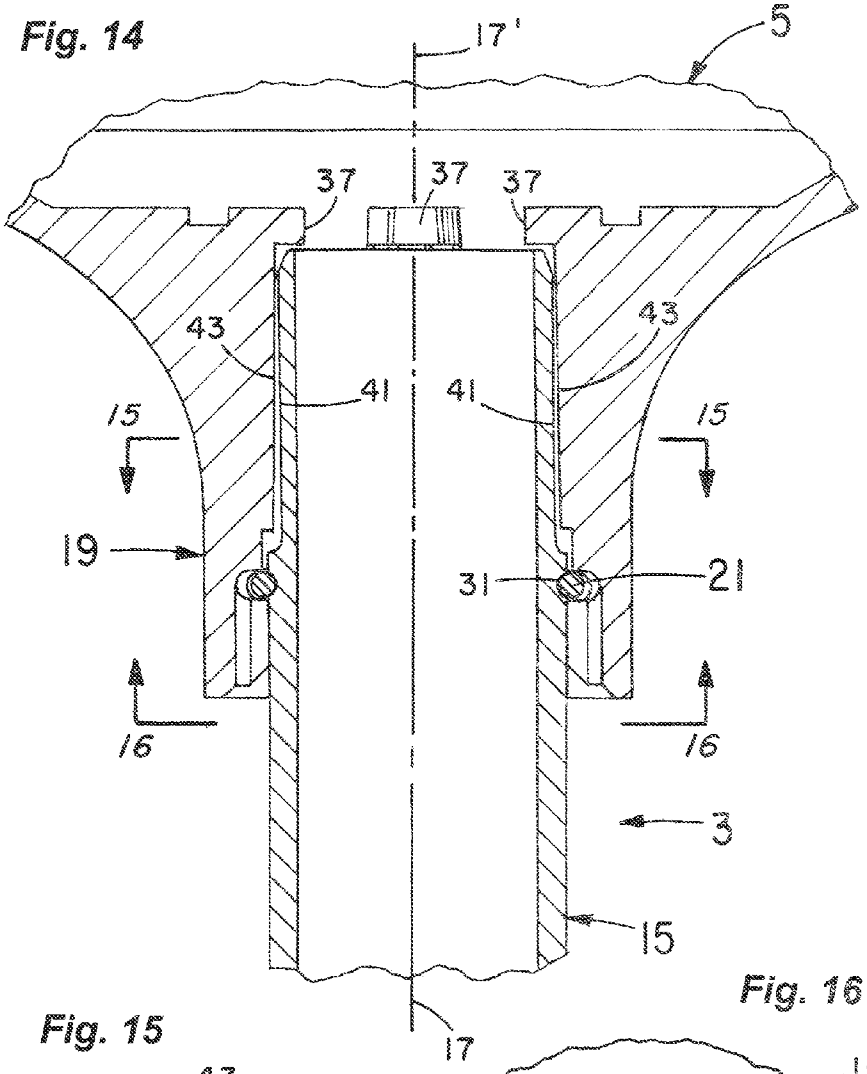
Figure 15:
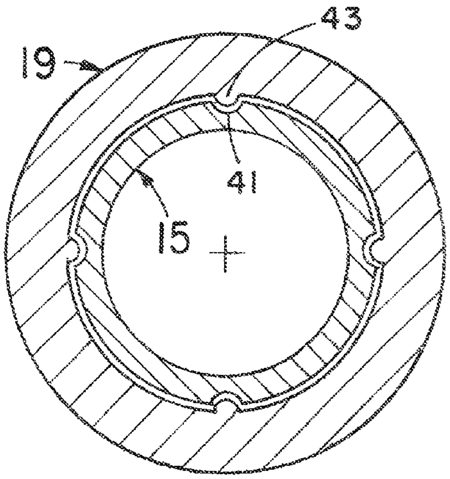
FIG. 15 is a view taken along line 15-15 of FIG. 14.
Figure 16:
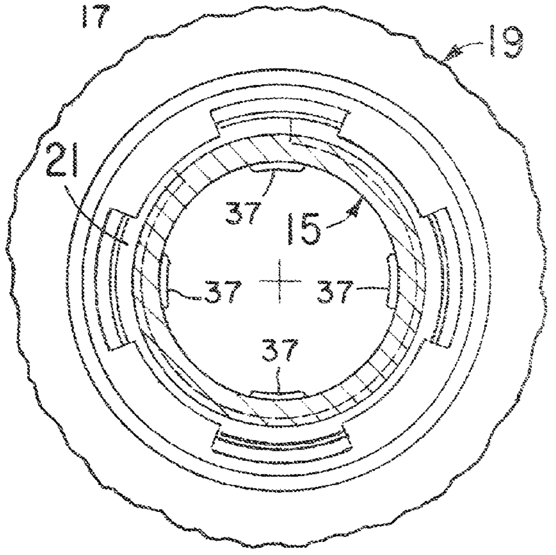
FIG. 16 is a view taken along line 16-16 of FIG. 14.

As also shown in FIG. 14, safety stop members 37 extending inwardly toward the axis 17' of the female portion 19 of the antenna head beyond the outward extent of the male portion 15 of the pedestal 3 can also be provided if desired. Such safety stop members 37 would serve to positively prevent the male and female portions 15,19 from being moved toward each other substantially beyond the predetermined position of FIG. 14 and in this way stop the male portion 15 from contacting and potentially damaging the antenna element in the antenna head 5.

The pedestal 3 and antenna head 5 of the present invention also have anti-rotation structure to prevent them from being rotated relative to each other as they are moved together in the sequence of FIGS. 11-14. This anti-rotation structure then prevents the coaxial cable 11,11' of FIG. 4 running between the antenna head and pedestal from being undesirably rotated or twisted beyond a safe extent (e.g., one turn or 360 degrees) as the pedestal and antenna head are assembled together. That is, the anti-rotation structure will prevent such undesirable rotation and twisting of the connected cable 11,11' that can cause the cable to pull and twist the relatively delicate antenna element 9 in the antenna head 5 of FIG. 4 and its attachments and severely damaging the unit. The twisted cable can also undesirably pull and twist the electronic attachments and equipment below the pedestal 3 leading to the interior of the recreational vehicle 2 and the televisions or other devices in it.

Figure 10:
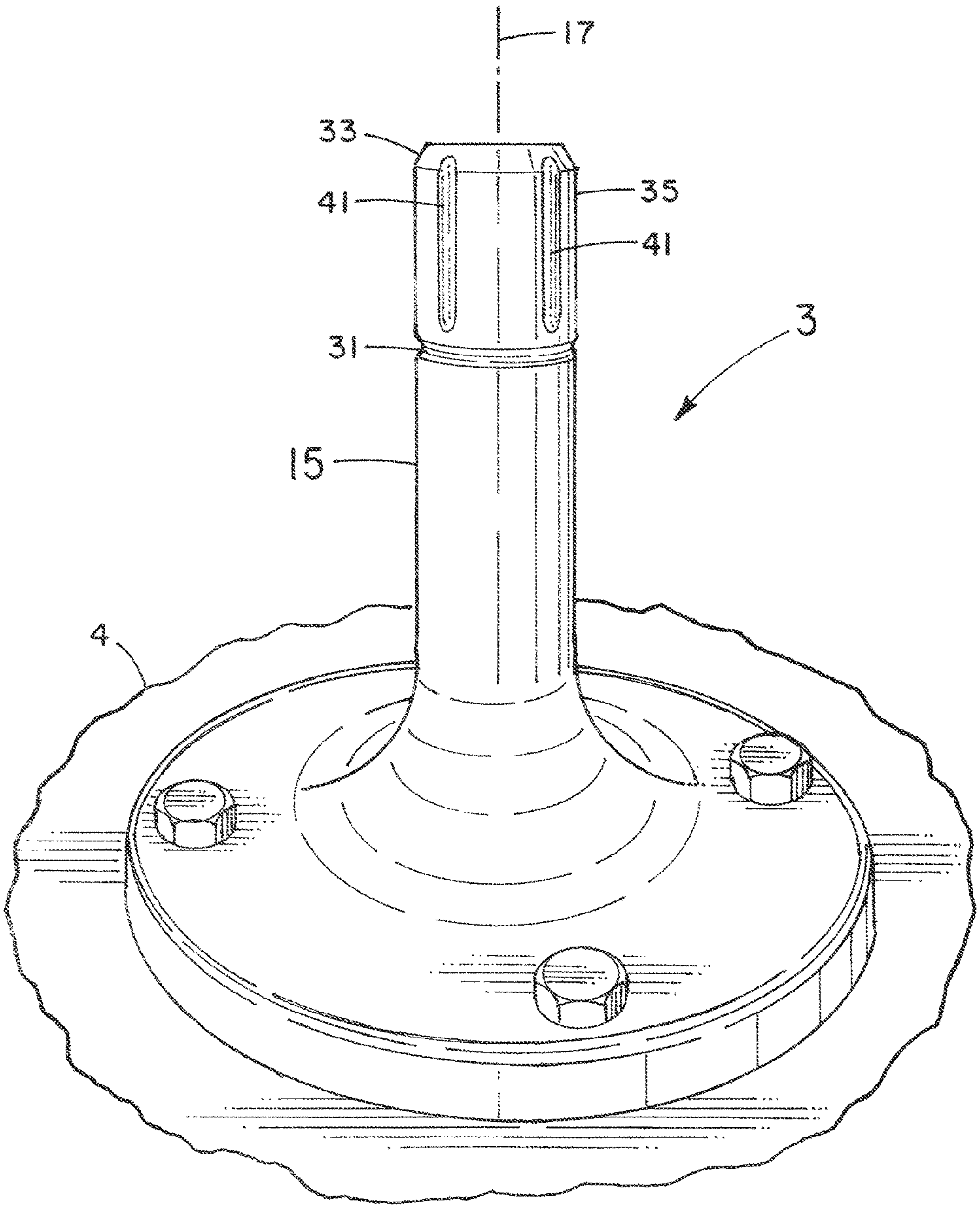
FIG. 10 is an enlarged view of the pedestal of the mounting system.
Figure 11:
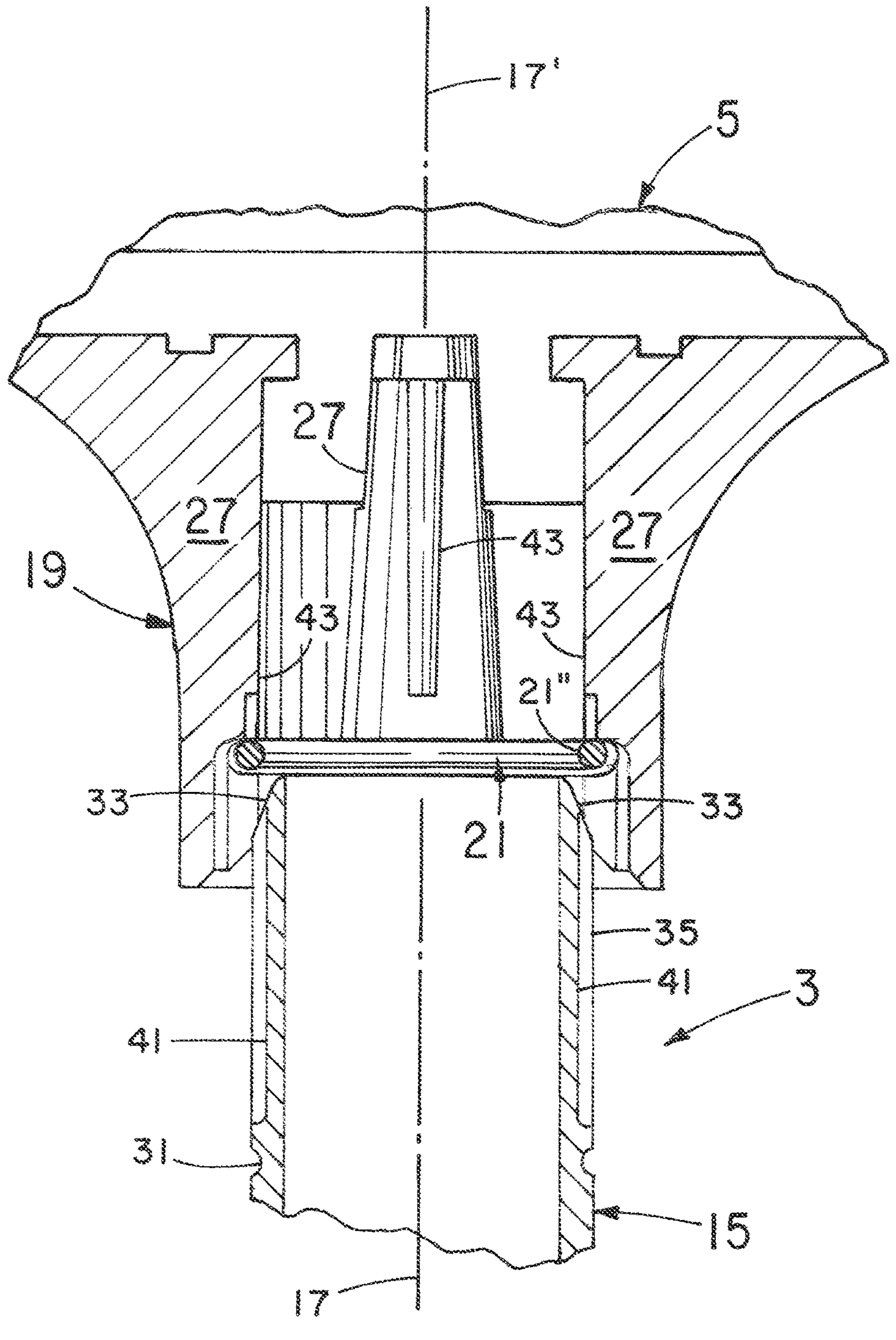
FIGS. 11-14 sequentially show the pedestal and antenna head being moved axially together to the secured and locked, predetermined operating position of FIG. 14.
Figure 12:
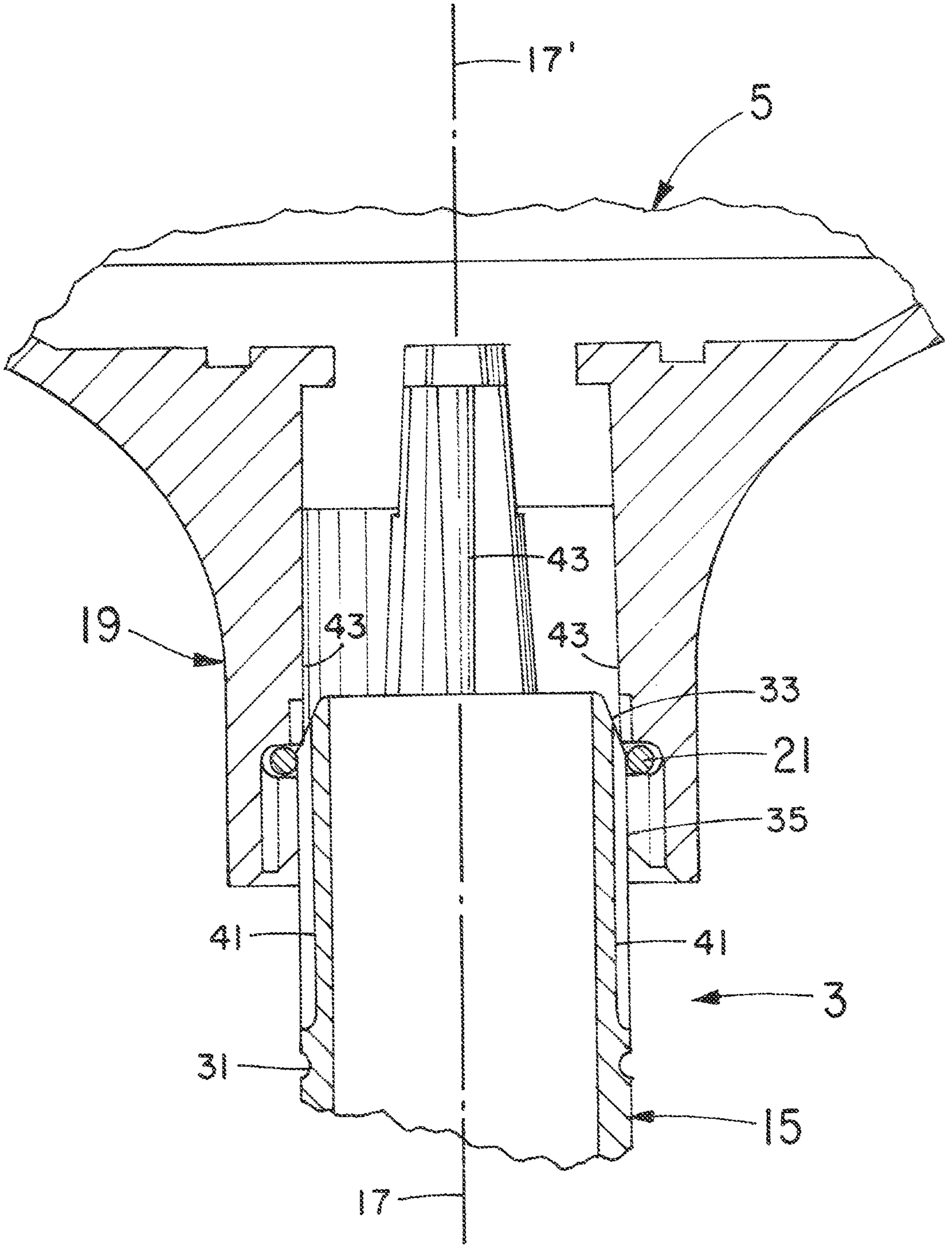
Figure 13:
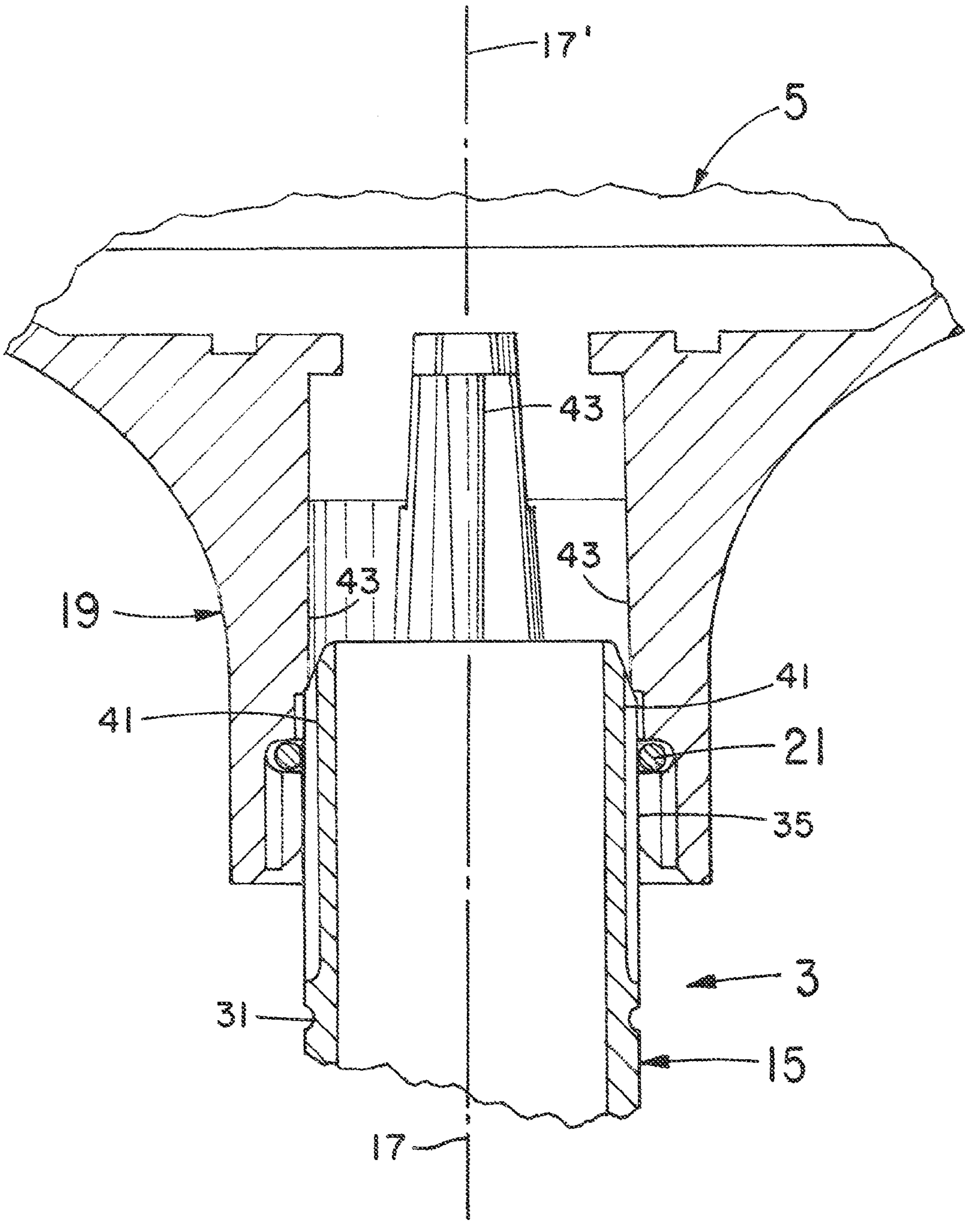

In this regard and as seen in FIGS. 5 and 10, the male portion 15 of the pedestal 3 has at least one channel 41 (FIG. 5) and preferably multiple channels 41 (e.g., two to four) as in FIG. 10 extending along the axis 17 above the recess 31. With the pedestal 3 secured to the roof 4 of the recreational vehicle in FIGS. 5 and 10 and the cable sections 11,11' of FIG. 4 connected to one another, the antenna head 5 and pedestal 3 are then manually moved toward each other to an initial position such as in FIG. 11 with the axes 17,17' aligned. The female portion 19 of the antenna head 5 as perhaps best seen in FIG. 11 has at least one and preferably more (e.g., two to four) protuberances 43 on the members 27 (see also FIGS. 9*a* and 9*b*). The protuberances 43 as shown extend along the axis 17' of the antenna head 5 and are receivable in the respective channels 41 on the male portion 15 of the pedestal 3 (FIGS. 11-15). The male and female portions 15,19 of the pedestal 3 and antenna head 5 can thus be initially moved axially toward each other as in FIGS. 11-12 and rotated relative to each other about the aligned axes 17,17' until the respective ends of the channels 41 and protuberances 43 align. As for example and in the case of four pairs of channels/protuberances 41,43, the pedestal 3 and antenna head 5 would be rotated no more than about 90 degrees (i.e., 360 degrees/4 pairs) before such alignment would occur. Similarly and with a single channel/protuberance 41,43, the maximum relative rotation would be no more than one turn or 360 degrees before such an alignment. Such alignments are normally felt tactilely by the installer (i.e., the resistance to moving the antenna head 5 and pedestal 3 axially together from FIG. 12 to FIG. 13 is eliminated when the respective channel(s)/protuberance(s) 41,43 align). Once so aligned, the assembly progression can proceed with the pedestal 3 and antenna 5 snapping into the predetermined position of FIG. 14 and being secured together in a locking engagement. Like the initial alignment of the channels and protuberances 41,43, the snapping engagement of the male and female portions 15,19 in the locking, predetermined position can be tactilely felt by the installer and may also be audibly heard.

Figure 17:
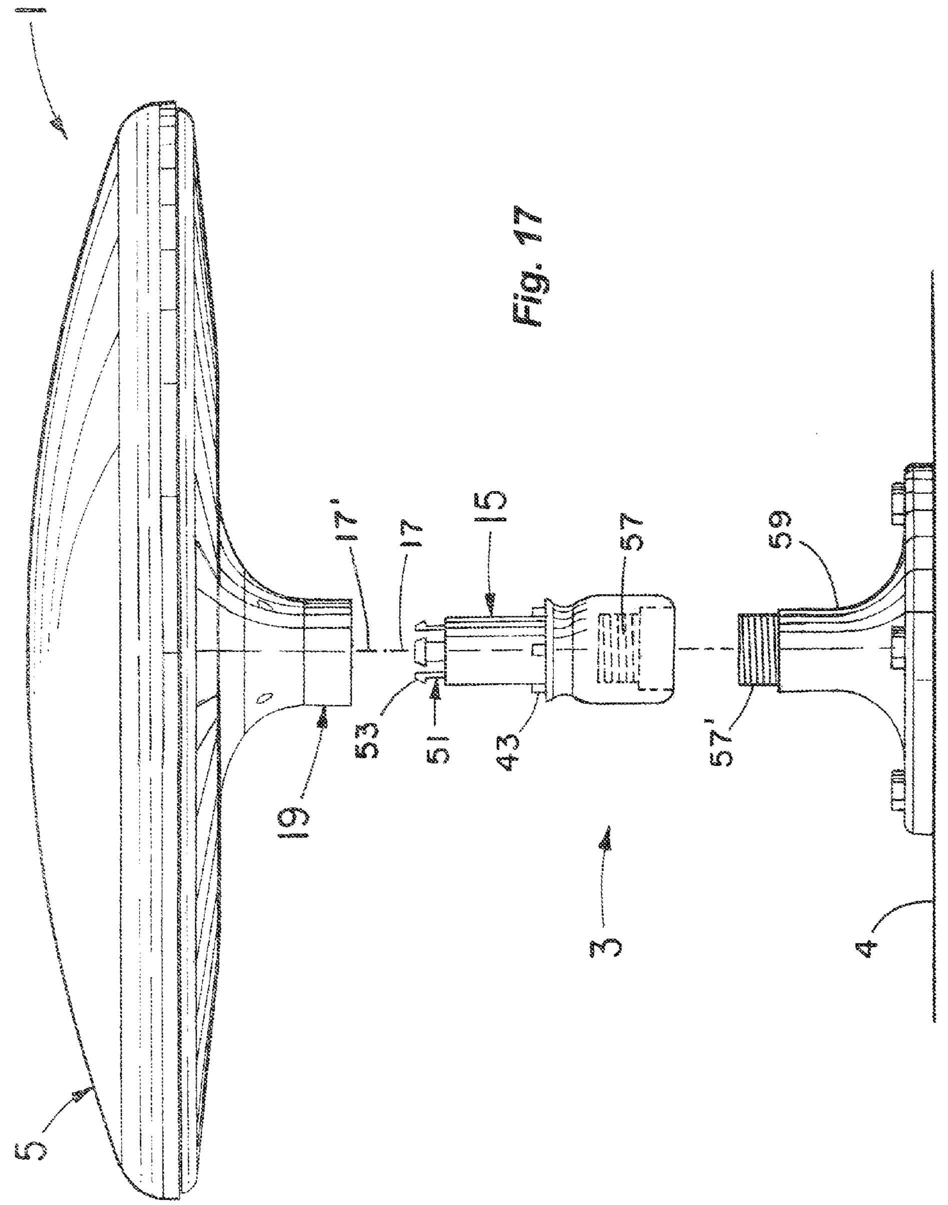
FIG. 17 is a partially exploded view of a second embodiment of the antenna mounting system of the present invention.
Figure 18:
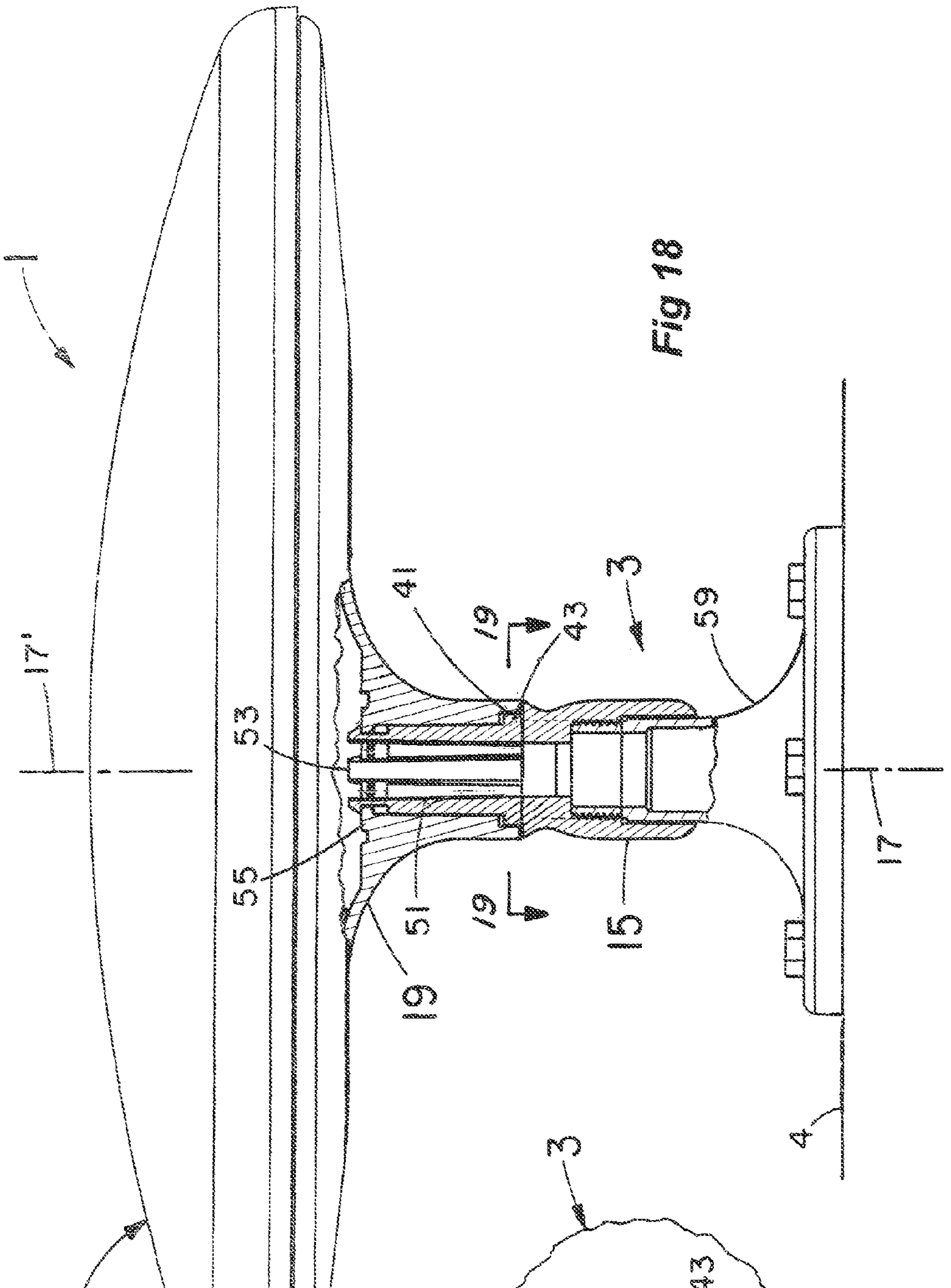
FIG. 18 is a partial cross sectional view of the assembled embodiment of FIG. 17.
Figure 19:
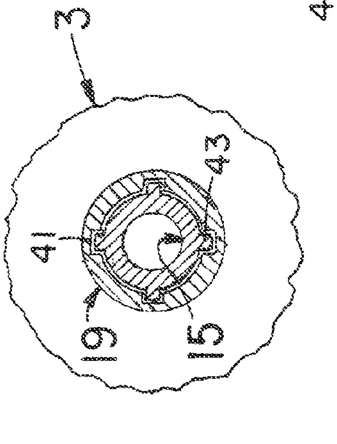
FIG. 19 is a view taken along line 19-19 of FIG. 18.

Although the protuberances 43 in the embodiment of FIGS. 1-16 are shown as being on the female portion 19 of the antenna head 5 and the channels 41 in the male portion 15 of the pedestal 3, the positioning could be reversed as in the embodiment of FIGS. 17-19. The desired snap arrangement to secure the pedestal 3 and antenna head 5 in their predetermined position could also be accomplished using the upstanding and resilient, prong members 51 of FIGS. 17-18. That is, the resilient members 51 of FIGS. 17-18 on the male portion 15 of the pedestal 3 extend along and about the axis 17 and have outwardly protruding catch sections 53 adjacent their free standing ends. The catch sections 53 extend substantially perpendicular to the aligned axes 17,17' as shown in FIGS. 17-18 and respectively snap over the ledges or receiving parts 55 (FIG. 18) of the female portion 19 of the antenna head 5.

In the embodiment of FIGS. 17-18, the pedestal 3 can be a two-piece one if desired with the male portion 15 of the pedestal 3 separately securable (e.g., by mating, threaded portions 57,57') to the base 59 of the pedestal 3. If the male portion 15 is a separate piece, it would preferably first be secured (e.g., screwed) onto the base 59 attached to the roof 4 of the recreational vehicle of FIG. 17 after which the coaxial cables 11,11' as in FIG. 4 would be connected. The channel(s)/protuberance(s) 41,43 of FIGS. 18-19 would then be aligned and the pedestal 3 and antenna head 5 moved axially toward each other until reaching the snapping, predetermined position of FIG. 18.

As in the other embodiment of FIGS. 1-16, the male and female portions 15 and 19 of FIG. 17 are moved as mentioned above toward each other to the secured, predetermined position of FIG. 18. In doing so, each upstanding, resilient member 51 with its catch section 53 contacts the ledge or receiving part 55 on the female portion 19 and is moved from its first position of FIG. 17 to a tensioned, second position as it passes by. In the predetermined position, each tensioned member 51 then snaps away from this tensioned, second position to lockingly engage its catch section 53 and the receiving ledge or part 55 on the female portion 19.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims. In particular, it is noted that the word substantially is utilized herein to represent the inherent degree of uncertainty that may be attributed to any quantitative comparison, value, measurement or other representation. This term is also utilized herein to represent the degree by which a quantitative representation may vary from a stated reference without resulting in a change in the basic function of the subject matter involved.

I claim:

1. An antenna mounting system comprising:

a pedestal securable to a supporting object and an antenna head containing an antenna element and securable to said pedestal, said pedestal having an upstanding male portion extending along and about a first axis, said antenna head having a female portion extending along and about a second axis, said upstanding male portion of said pedestal being receivable in said female portion of the antenna head with the first and second axes substantially aligned and the female and male portions movable axially toward each other along said aligned first and second axes to a predetermined position relative to each other, said antenna mounting system further including a snap arrangement for securing the female and male portions of the antenna head and pedestal together in said predetermined position, said snap arrangement including at least one resilient member mounted on at least one of said female and male portions and movable between first and second positions, said resilient member being tensioned in said second position to move toward said first position, said other of said female and male portions contacting and moving said resilient member from said first position to said tensioned, second position as said female and male portions are moved axially toward each other toward said predetermined position, said resilient member snapping into locking engagement with the other of the female and male portions at said predetermined position to secure said female and male portions in said predetermined position relative to each other wherein said resilient member is a ring extending substantially about said aligned first and second axes and said male portion has a recess extending substantially about and facing outwardly of said first axis, said recess in said male portion having a substantially C-shaped cross section, said female portion having a recess arrangement extending substantially about said second axis and having upwardly and downwardly facing portions together forming a recess with a substantially C-shaped cross section facing inwardly toward said second axis for receiving an outer section of said resilient ring therein, said outer section of said ring being positionable in the recess of the female portion of said antenna head with an inner section of the ring protruding inwardly toward said second axis, said upstanding male portion of said pedestal being receivable in the female portion of said antenna head with the first and second axes substantially aligned and the female and male portions moved axially toward each other along said aligned first and second axes until said recesses in said female and male portions are substantially aligned and the inner section of the ring snaps into the recess in the male portion of the pedestal to secure said female and male portions in said locking engagement at said predetermined position wherein the recess arrangement of said female portion of the antenna head has a plurality of members spaced from each other about the second axis of the female portion with the upwardly and downwardly facing portions forming the recess in said female portion being respectively in adjacent of said staggered members about the second axis.

2. An antenna mounting system comprising:

a pedestal securable to a supporting object and an antenna head containing an antenna element with an antenna cable attached thereto, said antenna head being securable to said pedestal, said pedestal having an upstanding male portion extending along and about a first axis, said antenna head having a female portion extending along and about a second axis, said upstanding male portion of said pedestal being receivable in said female portion of the antenna head with the first and second axes substantially aligned and the female and male portions axially aligned and movable axially toward each other along said aligned first and second axes to a predetermined position relative to each other, said antenna cable being extendable from said antenna element through said aligned female and male portions, said antenna mounting system further including a snap arrangement for securing the female and male portions of the antenna head and pedestal together in said predetermined position, said snap arrangement including at least one resilient member mounted on at least one of said female and male portions and movable between first and second positions, said resilient member being tensioned in said second position to move toward said first position, said other of said female and male portions contacting and moving said resilient member from said first position to said tensioned, second position as said female and male portions are moved axially toward each other toward said predetermined position, said resilient member snapping into locking engagement with the other of the female and male portions at said predetermined position to secure said female and male portions in said predetermined position relative to each other, said antenna mounting system further including anti-rotation structure for positively preventing the axially aligned antenna head and pedestal from being rotated relative to each other about the aligned first and second axes as said female and male portions are axially moved toward each other from a first position spaced from said predetermined position to said predetermined position, said anti-rotation structure additionally preventing the antenna cable extendable from said antenna element through said female and said male portions from twisting about said aligned first and second axes as said female and male portions are axially moved toward each other from said first position spaced from said predetermined position to said predetermined position.

3. The antenna mounting system of claim 2 wherein said anti-rotation structure includes at least one protuberance spaced from and extending along said aligned first and second axes on one of the female and male portions and receivable in at least one channel spaced from and extending along said aligned first and second axes on the other of said female and male portions.

4. The antenna mounting system of claim 3 wherein said resilient member is a ring extending substantially about said aligned first and second axes and said male portion has a recess extending substantially about and facing outwardly of said first axis to receive a section of said ring and wherein said pedestal has a free standing end section and the recess in said pedestal receiving the section of the ring is spaced farther from the end section thereof than the at least one of the protuberance and channel on the pedestal.

5. The antenna mounting system of claim 4 wherein the channel is in the pedestal.

6. The antenna mounting system of claim 2 wherein said anti-rotation structure includes a plurality of protuberances spaced from and extending along said aligned first and second axes on one of the female and male portions and respectively receivable in a plurality of channels spaced from and extending along said aligned first and second axes on the other of said female and male portions, said protuberances and channels being respectively spaced from each other about the aligned first and second axes.

7. The antenna mounting system of claim 2 wherein said anti-rotation structure includes at least one protuberance spaced from and extending along the aligned first and second axes on one of the female and male portions and receivable in at least one channel spaced from and extending along said aligned first and second axes on the other of said female and male portions, said protuberance and channel having respective ends alignable with each other in a first relative position about the aligned first and second axes wherein movement of the female and male portions toward each other in said first relative position along the aligned first and second axes will engage the protuberance in said channel to positively prevent rotation of the female and male portions of the antenna head and pedestal relative to each other about the aligned first and second axes.

8. The antenna mounting system of claim 7 wherein the protuberance and channel are respectively spaced about the first and second axes and rotation of the female and male portions of the antenna head and pedestal relative to each other about the aligned first and second axes to said first relative position will align the protuberance and channel in said first relative position within a rotational angle no more than 360 degrees.

9. The antenna mounting system of claim 7 further including a plurality of protuberances and channels with respective ends substantially evenly spaced about the respective first and second axes wherein each individual protuberance and each individual channel together form a pair with the number of such pairs being predetermined wherein respective pairs of said individual protuberances and individual channels will align with each other in said first relative position within a rotational angle no more than 360 degrees divided by said predetermined number of pairs.

10. An antenna mounting system comprising:

a pedestal securable to a supporting object and an antenna head containing an antenna element with an antenna cable attached thereto, said antenna head being and securable to said pedestal, said pedestal having an upstanding male portion extend along and about a first axis, said antenna head having a female portion extending along and about a second axis, said upstanding male portion of said pedestal being receivable in said female portion of the antenna head with the first and second axes substantially aligned and the female and male portions movable axially toward each other along said aligned first and second axes to a predetermined position relative to each other, said antenna cable being extendable from said antenna element through said aligned female and male portions, said antenna mounting system further including a snap arrangement for securing the female and male portions of the antenna head and pedestal together in said predetermined position, said snap arrangement including at least one resilient member mounted on at least one of said female and male portions and movable between first and second positions, said resilient member being tensioned in said second position to move toward said first position, said other of said female and male portions contacting and moving said resilient member from said first position to said tensioned, second position as said female and male portions are moved axially toward each other toward said predetermined position, said resilient member snapping into locking engagement with the other of the female and male portions at said predetermined position to secure said female and male portions in said predetermined position relative to each other, said antenna mounting system further including anti-rotation structure for positively preventing the antenna cable extendable from said antenna element through said female and male portions from being twisted about said aligned first and second axes and the antenna head and pedestal from being rotated relative to each other about the aligned first and second axes as said female and male portions are moved toward each other from a first position spaced from said predetermined position to said predetermined position, said anti-rotation structure further preventing said antenna cable from being twisted and said antenna head and pedestal from being rotated relative to each other about the aligned first and second axes in at said predetermined position.

11. An antenna mounting system comprising:

a pedestal securable to a supporting object and an antenna head containing an antenna element with an antenna cable attached thereto said antenna head being securable to said pedestal, said pedestal having an upstanding male portion extending along and about a first axis, said antenna head having a female portion extending along and about a second axis, said upstanding male portion of said pedestal being receivable in said female portion of the antenna head with the first and second axes substantially aligned and the female and male portions axially aligned and movable axially toward each other along said aligned first and second axes to a predetermined position relative to each other, said antenna cable being extendable from said antenna element through said female portion and said male portion, said antenna mounting system further including anti-rotation structure for positively preventing the axially aligned antenna head and pedestal from being rotated relative to each other about the aligned first and second axes as said female and male portions are axially moved toward each other from a first position spaced from said predetermined position to said predetermined position, said anti-rotation structure additionally preventing the antenna cable extendable from said antenna element through said female and said male portions from twisting about said aligned first and second axes as said female and male portions are axially moved toward each other from said first position spaced from said predetermined position to said predetermined position.

12. The antenna mounting system of claim 11 wherein said anti-rotation structure includes at least one protuberance spaced from and extending along the aligned first and second axes on one of the female and male portions and receivable in at least one channel spaced from and extending along said aligned first and second axes on the other of said female and male portions, said protuberance and channel having respective ends alignable with each other in a first relative position about the aligned first and second axes wherein movement of the female and male portions axially toward each other in said first relative position along the aligned first and second axes will engage the protuberance in said channel to positively prevent rotation of the female and male portions of the antenna head and pedestal relative to each other about the aligned first and second axes as said female and male portions are axially moved toward each other from said first position spaced from said predetermined position to said predetermined position.

13. The antenna mounting system of claim 12 wherein the protuberance and channel are respectively spaced about the first and second axes and rotation of the female and male portions of the antenna head and pedestal relative to each other about the aligned first and second axes to said first relative position will align the protuberance and channel in said first relative position within a rotational angle no more than 360 degrees.

14. The antenna mounting system of claim 13 wherein said protuberance is on the female portion of said antenna head.

15. The antenna mounting system of claim 13 wherein said protuberance is on the male portion of said pedestal.

16. The antenna mounting system of claim 12 further including a plurality of protuberances and channels with respective ends substantially evenly spaced about the respective first and second axes wherein each individual protuberance and each individual channel together form a pair with the number of such pairs being predetermined wherein rotation of the female and male portions of the antenna head and pedestal relative to each other about the aligned first and second axes to said first relative position will align respective pairs of said individual protuberances and said individual channels with each other in said first relative position within a rotational angle no more than 360 degrees divided by said predetermined number of pairs.

17. The antenna mounting system of claim 16 wherein said protuberances are on the female portion of said antenna head.

18. The antenna mounting system of claim 16 wherein said protuberances are on the male portion of said pedestal.

19. The antenna mounting system of claim 12 wherein the protuberance and channel remain engaged at the predetermined position of the female and male portions of the antenna head and pedestal to positively prevent relative rotation of said female and male portions about the aligned first and second axes at said predetermined position.

20. The antenna mounting system of claim 11 further including a snap arrangement for securing the female and male portions of the antenna head and pedestal together in said predetermined position, said snap arrangement including at least one resilient member mounted on at least one of said female and male portions and movable between first and second positions, said resilient member being tensioned in said second position to move toward said first position, said other of said female and male portions contacting and moving said resilient member from said first position to said tensioned, second position as said female and male portions are moved axially toward each other toward said predetermined position, said resilient member snapping into locking engagement with the other of the female and male portions at said predetermined position to secure said female and male portions in said predetermined position relative to each other.

21. The antenna mounting system of claim 20 wherein the resilient member of said snap arrangement has a section thereof protruding substantially perpendicular to the aligned first and second axes, said section engaging the other of said female and male portions in said locking engagement at said predetermined position of said female and male portions relative to each other.

* * * * *